United States Patent Office — 2,877,270 — Patented Mar. 10, 1959

2,877,270

ETHYLENE COMPOUNDS

William Laszlo Bencze, Summit, N. J., assignor to Ciba Pharmaceutical Products, Inc., Summit, N. J., a corporation of New Jersey No Drawing. Application April 8, 1957
Serial No. 651,172

6 Claims. (Cl. 260—570)

This invention relates to 1,1-disubstituted ethylene compounds of the formula:

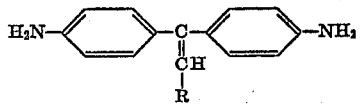

in which R represents hydrogen or a lower alkyl radical, and salts thereof, as well as the process of manufacturing such compounds. Lower alkyl radicals contain from 1 to 7 carbon atoms and are, for example, ethyl, propyl or particularly methyl radicals.

Salts of the new compounds of this invention are particularly therapeutically useful acid addition salts, such as those with inorganic acids, such as, hydrohalic acids, e. g. hydrochloric, hydrobromic or hydriodic acid; perchloric, nitric or thiocyanic acid; or sulfuric or phosphoric acids; or those with organic acids, such as formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, p-aminobenzoic, p-hydroxybenzoic, anthranilic, cinnamic, mandelic, salicylic, p-aminosalicylic, 2-phenoxybenzoic, 2-acetoxy-benzoic, methane sulfonic, ethane sulfonic, hydroxyethane sulfonic, benzene sulfonic, p-toluene sulfonic, naphthalene sulfonic or sulfanilic acid or methionine, tryptophane, lysine or arginine.

The new compounds of this invention inhibit the activity of the adrenal cortex and may be used in diseases, wherein the adrenal cortex is involved in undesirable salt and water retention, such as, for example, in cardiac failure or liver disease with ascites. Especially valuable with respect to the adrenal cortical inhibitory activity is the compound of the formula:

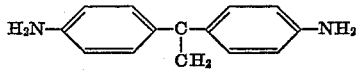

and the hydrohalic acid addition salts, such as the dihydrochloride. The compounds of this invention, especially the 1,1-di-(4-aminophenyl)-ethylene dihydrochloride, in a dose of from about 5 to about 100 mg. per kg. (parenterally), are capable of reversing experimentally induced ascites in the dog, resulting in an increased output of urine and sodium.

Furthermore, the 1,1-disubstituted ethylene compounds of this invention may also be used as diagnostic agents to define the pathogenic role of aldosterone in patients exhibiting sodium retention associated with increased urinary excretion of the steroid, and thus aid in predicting the results of adrenal surgery.

The new compounds may be used as medicaments in the form of pharmaceutical preparations, which contain the new compounds in admixture with a pharmaceutical organic or inorganic, solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, cholesterol or any other known carrier for medicaments. The pharmaceutical preparations may be, for example, in the form of tablets or dragees, or in liquid form as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

1,1-di-substituted ethylene compounds or the salts thereof may be prepared by converting an α,α-di-substituted ketone of the formula:

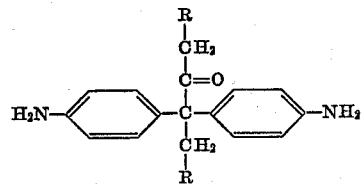

in which R has the meaning given above, or a salt thereof, into its oxime and treating the oxime with a strong Lewis acid and, if desired, converting any resulting salt into the free base, and/or converting any free base into a salt thereof.

Salts of the α,α-di-substituted ketones used as the starting material are more especially those with inorganic acids, such as hydrohalic acids, e. g. hydrochloric, hydrobromic, or hydriodic acid; or sulfuric acid.

Oximes of the formula:

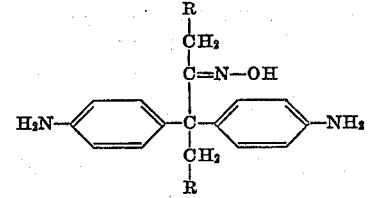

in which R has the meaning given above, or the salts thereof are new and are intended to be included within the scope of the invention. They are valuable intermediates in the preparation of the new 1,1-di-substituted ethylene compounds and may be prepared by treatment of an α,α-di-substituted ketone of the formula:

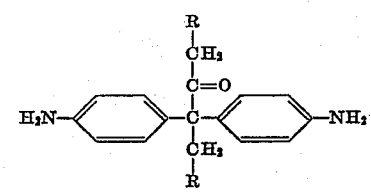

in which R has the meaning given above, or salts thereof, with hydroxylamine or a salt, e. g. the hydrochloride or sulfate thereof.

A strong Lewis acid bringing about the rearrangement of the oxime of α,α-di-(4-amino-phenyl)-ketones, to the corresponding 1,1-di-substituted ethylene compounds, may be, for example, sulfuric acid, phosphorous pentachloride, p-toluene- or benzenesulfonic acid chloride or preferably polyphosphoric acid. The reaction may be carried out in the absence or presence of a solvent, at room temperature or at an elevated temperature. The compounds obtained according to the above process may preferably be purified by distillation under reduced pressure, ranging from 0.001 to 15 mm./Hg. They may also be isolated in pure form by recrystallization from an alcoholic solvent, such as methanol or ethanol, if desired with addition of water.

Depending on the conditions used the new compounds are obtained in the form of the free bases or salts thereof.

The salts may be converted into the free bases in the customary way, e. g. by reaction with an alkali metal hydroxide, such as sodium hydroxide. The free bases may be transformed into their therapeutically useful acid addition salts by reaction with appropriate inorganic or organic acids, e. g. the acids outlined above.

The starting materials used in the reaction outlined above are known and may be prepared, for example, by refluxing a dihydrohalide salt, e. g. the dihydrochloride of a 2,3-di-(4-aminophenyl)-2,3-dihydroxy-butane, which in the 1 and/or 4-positions contains the radical R of the above-given meaning, in an aqueous solution, whereupon the salt of a 3,3-di-(4-aminophenyl)-butane-2-one is formed, which, if desired, may be converted into the free base, for example, by treatment with an alkali metal hydroxide, e. g. sodium hydroxide in aqueous solution.

This is a continuation-in-part application of my application Serial No. 641,259, filed February 20, 1957, now abandoned.

The following example is intended to illustrate the invention. It is not to be construed as being a limitation thereon. Temperatures are given in degrees centigrade.

*Example*

1 g. of 3,3-di-(4-aminophenyl)-butane-2-one dihydrochloride is dissolved in 10 ml. of 95 percent ethanol and after addition of 3 ml. of a 5 molar aqueous solution of hydroxylamine sulfate and 3 ml. of a 7 molar aqueous solution of sodium acetate, the solution is refluxed for 5 hours. The reaction mixture is diluted with water and extracted twice with ethyl acetate. The combined extracts are washed, dried over potassium carbonate and the solvent evaporated. The resulting crude oxime is recrystallized from a mixture of ethanol and water, M. P. 216–218°.

0.5 g. of the 3,3 - di - (4-aminophenyl)-butane-2-one oxime is mixed with 20 g. of polyphosphoric acid and the mixture stirred and heated to 110–120° C. for 15 minutes. After addition of ice, the reaction mixture is rendered basic to a pH=8 with a concentrated aqueous solution of sodium hydroxide, and extracted twice with ethyl acetate. The viscous oil thus obtained is distilled under reduced pressure, B. P. 180–210°/0.04 mm. Hg and yields 0.28 g. of 1,1-di-(4-aminophenyl)-ethylene of the formula:

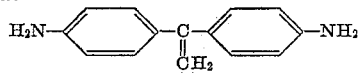

which upon recrystallization from a mixture of ethanol and water melts at 170–172°.

The hydrochloride of the 1,1-di-(4-aminophenyl)-ethylene may be prepared by treating a mixture of 0.84 g. of the free base in 10 ml. of water with a few drops of dilute hydrochloric acid to ascertain complete solution and adding 10 ml. of 38 percent aqueous hydrochloride. The dihydrochloride precipitates and after cooling is filtered off, M. P. 260° (with decomposition).

The 3,3-di-(4-aminophenyl)-butane-2-one dihydrochloride used as the starting material may be prepared as follows: 2 g. of 2,3-di-(4-aminophenyl)-2,3-dihydroxybutane dihydrochloride is refluxed in 25 ml. of water for 8 hours. The solution is concentrated under reduced pressure to a small volume, and after addition of ethanol the mixture is cooled. 1.28 g. of 3,3-di-(4-aminophenyl)-butane-2-one dihydrochloride is filtered off and washed with ethanol, M. P. 272–275°.

What is claimed is:

1. Process for the preparation of 1,1-di-(4-aminophenyl)-ethylene which comprises converting the dihydrochloride of the butane-2-one of the formula:

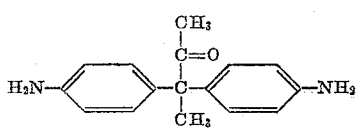

into the oxime by treatment with hydroxylamine sulfate and treating the resulting oxime with polyphosphoric acid.

2. In a process for the preparation of a member of the group consisting of 1,1-di-(4-aminophenyl)-ethylene and therapeutically useful acid addition salts thereof, the steps which comprise treating a member of the group consisting of 3,3-di-(4-aminophenyl)-butane-2-one and acid addition salts thereof with a member of the group consisting of hydroxylamine and an acid addition salt thereof and treating the resulting oxime with a member of the group consisting of polyphosphoric acid, concentrated sulfuric acid, phosphorus pentachloride, p-toluene sulfonic acid chloride and benzene sulfonic acid chloride.

3. Process for the preparation of 1,1-di-(4-aminophenyl)-ethylene which comprises converting the dihydrochloride of the butane-2-one of the formula:

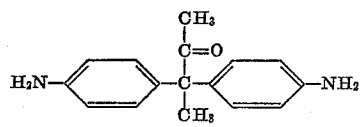

into the oxime by treatment with hydroxylamine sulfate and treating the resulting oxime with sulfuric acid.

4. Process for the preparation of 1,1-di-(4-aminophenyl)-ethylene which comprises converting the dihydrochloride of the butane-2-one of the formula:

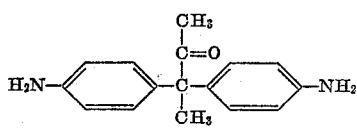

into the oxime by treatment with hydroxylamine sulfate and treating the resulting oxime with phosphorus pentachloride.

5. Process for the preparation of 1,1-di-(4-aminophenyl)-ethylene which comprises converting the dihydrochloride of the butane-2-one of the formula:

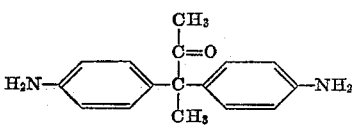

into the oxime by treatment with hydroxylamine sulfate and treating the resulting oxime with p-toluene sulfonic acid chloride.

6. Process for the preparation of 1,1-di-(4-aminophenyl)-ethylene which comprises converting the dihydrochloride of the butane-2-one of the formula:

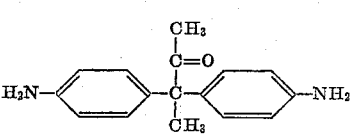

into the oxime by treatment with hydroxylamine sulfate and treating the resulting oxime with benzene sulfonic acid chloride.

References Cited in the file of this patent

UNITED STATES PATENTS 2,442,854    Leffler et al. _____ June 8, 1948

FOREIGN PATENTS 388,187    France _____ May 25, 1908

OTHER REFERENCES

Fecht: Ber. Deut. Chem. 40, 3893–3903 (1907), page 3895 relied on.

Fosse: Chem. Abst., vol. 2, 2387 (1908).